United States Patent [19]
Paradise

[11] Patent Number: 5,617,284
[45] Date of Patent: Apr. 1, 1997

[54] POWER SURGE PROTECTION APPARATUS AND METHOD

[76] Inventor: Rick Paradise, 515 Wood Forest Ct. NE., Marietta, Ga. 30066

[21] Appl. No.: 286,520

[22] Filed: Aug. 5, 1994

[51] Int. Cl.$^6$ .................................................. H02H 9/04
[52] U.S. Cl. .............................. 361/58; 361/56; 361/111
[58] Field of Search ........................ 361/111, 56, 118

[56] References Cited

U.S. PATENT DOCUMENTS

| | | | |
|---|---|---|---|
| 3,524,133 | 8/1970 | Arndt | 324/102 |
| 4,093,978 | 6/1978 | Plumer, Jr. | 361/118 |
| 4,259,705 | 3/1981 | Stifter | 361/56 |
| 4,358,808 | 11/1982 | Praeg | 361/11 |
| 4,584,622 | 4/1986 | Crosby et al. | 361/56 |
| 4,587,588 | 5/1986 | Goldstein | 361/54 |
| 4,630,163 | 12/1986 | Cooper et al. | 361/56 |
| 4,677,518 | 6/1987 | Hershfield | 361/56 |
| 4,698,721 | 10/1987 | Warren | 361/110 |
| 4,802,055 | 1/1989 | Beckerman | 361/56 |
| 4,845,580 | 7/1989 | Kitchens | 361/91 |
| 4,876,713 | 10/1989 | Crosby et al. | 379/412 |
| 4,999,729 | 3/1991 | Stifter | 361/56 |
| 5,038,245 | 8/1991 | Gronskog | 361/56 |
| 5,236,376 | 8/1993 | Cohen | 439/620 |

*Primary Examiner*—Todd DeBoer
*Attorney, Agent, or Firm*—Hopkins & Thomas; Scott A. Horstemeyer

[57] ABSTRACT

A power surge protection apparatus (10) protects circuitry from electrical surges induced in an alternating current power connection to the circuity. The apparatus (10) comprises first, second, and third stages (16, 17, 18), which serve to clamp and dissipate superfluous energy, such as that from a power surge, on the power connection (12a, 12b). The first stage (16) comprises a metal oxide varistor MOV 1 and a capacitor (C1) for helping to clamp and dissipate large-duration continuous surges on the power connection (12a, 12b). The second stage comprises an RC-LC filter with resistor R1, capacitor C2, inductor L1, and capacitor C3. Moreover, the second stage (17) has a metal oxide varistor MOV 2. Importantly, the second stage (17) further comprises a bifilar transformer T1 situated between the connections (24A, 24b). Specifically, the inductors of the bifilar transformer T1 are disposed in series with the connections (24a, 24b) of the power connection, and the connections (24a, 24b) are twisted about each other and wrapped in a bifilar winding configuration about a common core (26).

9 Claims, 5 Drawing Sheets

POWER SURGE PROTECTION APPARATUS AND METHOD

FIELD OF THE INVENTION

The present invention generally relates to power surge protection devices, and more particularly, to an apparatus and method for optimally suppressing electrical surges in an alternating current (AC) power connection to circuitry which is to be protected with minimum expense and space requirements.

BACKGROUND OF THE INVENTION

Communications equipment, computers, military targeting systems, home stereo amplifiers, televisions, and other electronic devices are increasingly characterized by small electronic contacts and miniature components which are very vulnerable to interference or damage from stray electrical energy surges of both the transient and continuous type carried by alternating current (AC) power lines. Unpredictable variations in power line voltage, as well as continuous noise thereon, changes the operating range of the equipment and can severely damage and/or destroy electronic devices. Moreover, these electronic devices can be very expensive to repair and replace and, therefore, require cost effective transient and continuous type noise protection.

There are many sources which can cause harmful electrical energy surges. One source is radio frequency (RF) interference that can be coupled to the power lines from a multitude of sources. The power lines act as large antennas that can be stretched out over several miles and which can have significant radio frequency noise coupled thereto from such sources as radio broadcast antennas. Another source of the harmful radio frequency energy is from the equipment to be protected itself, such as computers. Today, the Federal Communications Commission (FCC) has elaborate test procedures to prevent computers from being marketed that cause severe noise problems. Nevertheless, older computers still exist which emit significant amounts of radio frequency interference. Another harmful source is conductive noise, which is generated by equipment connected to the power lines and which is conducted along the power lines to the equipment to be protected. Still another source of harmful electrical energy is lightning. Lightning is a very complex electromagnetic energy source having potentials estimated at from 5 million to 20 million volts and currents reaching thousands of amperes (amp). A lightning strike generally contains a series of pulses, each having a duration of from one nanosecond ($10^{-9}$ s) to several milliseconds ($10^{-3}$ s). A typical "8/20" lightning pulse lasts for a period of 40 milliseconds and has a peak current of 20,000 amperes, which is reached in 8 microseconds.

In order to provide protection to circuitry against the foregoing sources of harmful electrical energy, a transient voltage surge must be clamped to a safe level, and the current must be adequately dissipated. There are generally three types of surge suppression devices or regulator devices commonly employed in low cost power line surge suppression units: (a) metal oxide varistors (MOV); (b) silicon avalanche diodes; and (c) gas discharge tubes (GDT). These devices have different operating characteristics and ratings and different failure, or "wear out," characteristics. Consequently, oftentimes, these devices are aggregated together to take advantage of the desirable characteristics of each device.

In surge suppression units using an MOV, the MOV clamping voltage must be above the peak of the highest expected line voltage. For nominal 120 volts alternating current (AC), with a ±10% variation tolerance, this means that the line voltage could be 132 volts AC. The peak voltage amplitude would be this number multiplied times the square root of 2 (i.e., 1.414), or 186 volts. Allowing for a 20% tolerance variation of the MOV, this brings the MOV rate of the clamping voltage to 225 volts. A 1 inch diameter MOV, rated at 70 joules (J), can absorb as much as 6,500 amperes of surge current before being destroyed. However, the high currents, along with the internal resistance of the MOV, allows the clamping voltage level to exceed its rating, which is usually at 10 amperes. Real clamping levels at 3,000 amperes can exceed 400 volts. The 400 volts clamping level is usually enough to damage most electronic equipment.

As mentioned, another commonly used component is the silicon avalanche diode, which is really a pair of back-to-back conventional zener diodes. This device has the advantage of a 5% tolerance and a lower impedance than the MOV. Accordingly, a lower clamping voltage can be specified without fear of coming too close to the 186 volts line peak. A 195 volts diode with 5% variation tolerance is usually specified. However, the current handling capability of the diode is limited to several hundred amperes, and a 3,000 ampere transient would certainly destroy it. Even so, it does have the advantage of maintaining its clamping voltage throughout its current range.

Furthermore, another commonly used component is the gas discharge tube (GDT). Such a device operates very slowing and ignores fast rise time transients. It also has the disturbing characteristic of remaining shorted until all current has been removed. Thus, it typically turns a transient surge into a total loss of power and a tripped circuit breaker.

Although meritorious to an extent, all of the previously described devices, combinations thereof, and other known arrangements in the industry have not proven to be entirely satisfactory. Accordingly, there is a heretofore unaddressed need in the industry for an improved transient voltage surge suppressor which is devoid of the drawbacks of the known arrangements, which is inexpensive, and which is requires little space for implementation.

SUMMARY OF THE INVENTION

An object of the present invention is to provide a power surge protection apparatus and method for suppressing electrical surges which overcome the inadequacies and deficiencies of the prior art as noted above and as generally known in the industry.

Another object of the present invention is to provide a power surge protection apparatus and method which optimally suppresses electrical surges inexpensively and with minimal space requirements and electronic parts.

Another object of the present invention is to provide a power surge protection apparatus which is durable in structure, simple in design, easily manufactured on a mass commercial scale, and efficient as well as reliable in operation.

Another object of the present invention is to provide a power surge protection apparatus and method for suppressing electrical surges in accordance with IEEE and ANSI specification requirements.

Briefly described, the present invention is a power surge protection apparatus for protecting circuitry from electrical surges induced in an alternating current power connection to the circuitry. The apparatus of the present invention employs several unique voltage clamping and current dissipation mechanisms which are not found in the prior art and which may be used to achieve very desirable surge protection with minimal expense and space requirements.

A significant feature of the apparatus is a bifilar transformer which has a common core with a bifilar winding of first and second power lines (for instance, hot and common lines). Specifically, the first and second lines are twisted about each other to form a twisted pair, and the twisted pair is wrapped around a common core in a bifilar winding configuration. In essence, a bifilar transformer is situated between and couples the first and second power lines. As a result of the aforementioned configuration, the electric field $\epsilon_1$ generated by the first line within the core and the electric field $\epsilon_2$ generated by the second line within the core are in opposite directions and, consequently, they compromise and inhibit each other.

In accordance with another significant feature of the present invention, the core preferably comprises a conductor, for example, copper, and the first and second lines comprise an ohmic material with a high resistivity $\rho$ (or low conductivity $\sigma$) relative to the core, for example, but not limited to, aluminum or steel. It should be further noted that the bifilar transformer may be utilized alone or in combination with other suppression devices, depending upon the circuitry to be protected and the desired suppression characteristics.

In accordance with another significant feature of the present invention, a rectifier circuit may be connected across the first and second lines of the power connection in order to facilitate suppression of electrical surges. Direct current is not utilized from the rectifier circuit, but instead the rectifier circuit is used as a mechanism for receiving, clamping, and dissipating electrical energy from the power connection. The rectifier circuit serves as an instantaneous clamping mechanism for tightly controlling the peak amplitude of the incoming power signal. The rectifier circuit may be utilized alone or in combination with other suppression devices, depending upon the circuitry to be protected and the desired suppression characteristics.

Other objects, features, and advantages of the present invention will become apparent to one of skill in the art upon examination of the following drawings and detailed description. It is intended that all additional objects, features, and advantages be incorporated herein and within the scope of the present invention.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
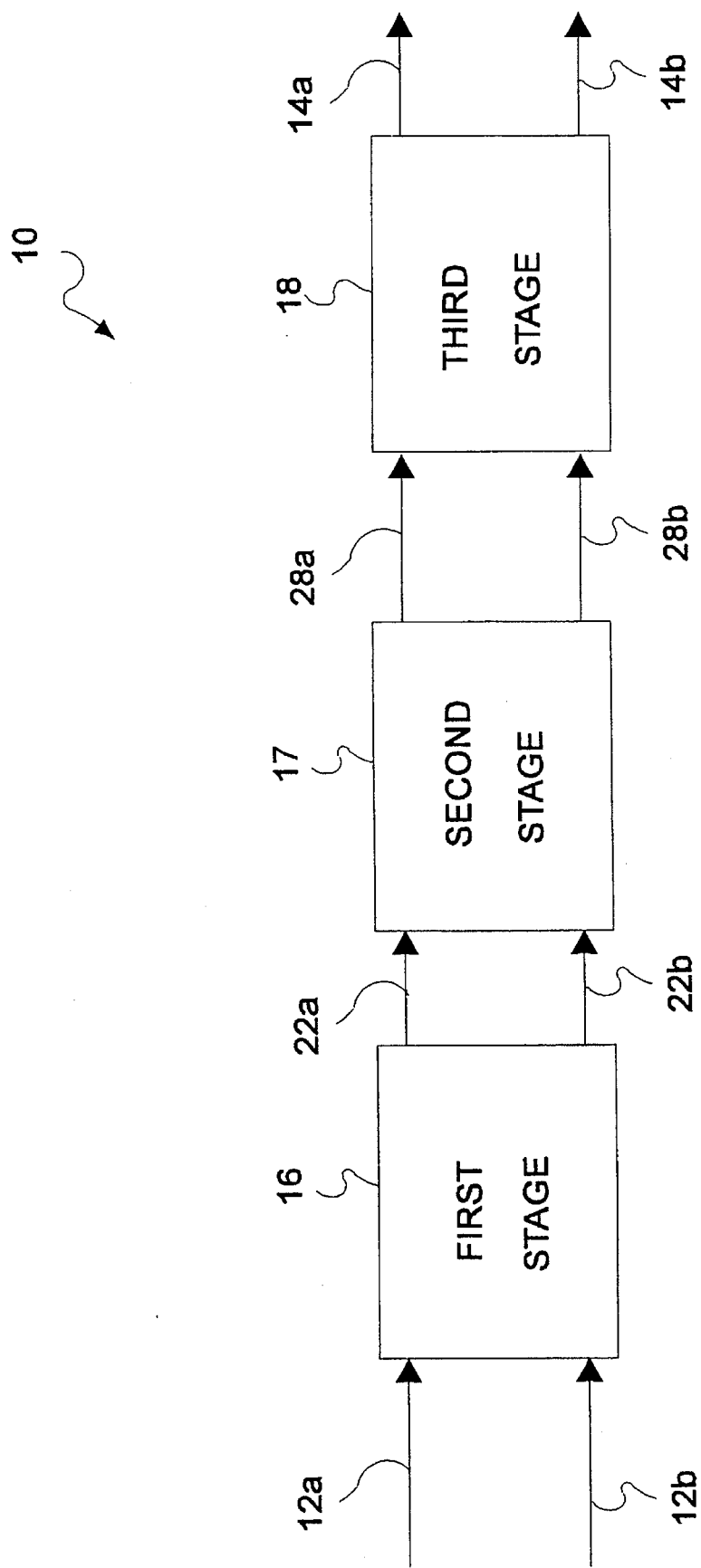
FIG. 1 is a high level block diagram of the power surge protection apparatus of the present invention.

With reference now to the drawings wherein like reference numerals designate corresponding parts throughout the several views, FIG. 1 is a high level block diagram of the power surge protection apparatus 10 in accordance with the present invention. The apparatus 10 employs circuitry which is an excellent tradeoff between expense and size versus performance in that the apparatus 10 is small compared to existing surge suppression apparatuses, can be inexpensively produced on a mass scale, and provides sufficiently adequate surge protection for many sensitive applications. The power surge protection apparatus 10 is interfaced between an alternating current (AC) electrical power source, for example but not limited to, a wall outlet, and circuitry to be protected, for example but not limited to, communications equipment, computers, military targeting systems, home stereo amplifiers, televisions, and other sensitive electronic devices.

In general, the architecture of the power surge protection apparatus 10 comprises three successive electrical circuit stages 16, 17, 18, which are connected together as shown in FIG. 1. Connections 12a, 12b receive the AC electrical power. Connections 22a, 22b connect the first stage 16 to the second stage 17. Connections 28a, 28b connect the second stage 17 to the third stage 18. Finally, connections 14a, 14b provide the protected electrical power to the circuitry to be protected.

Figure 2:
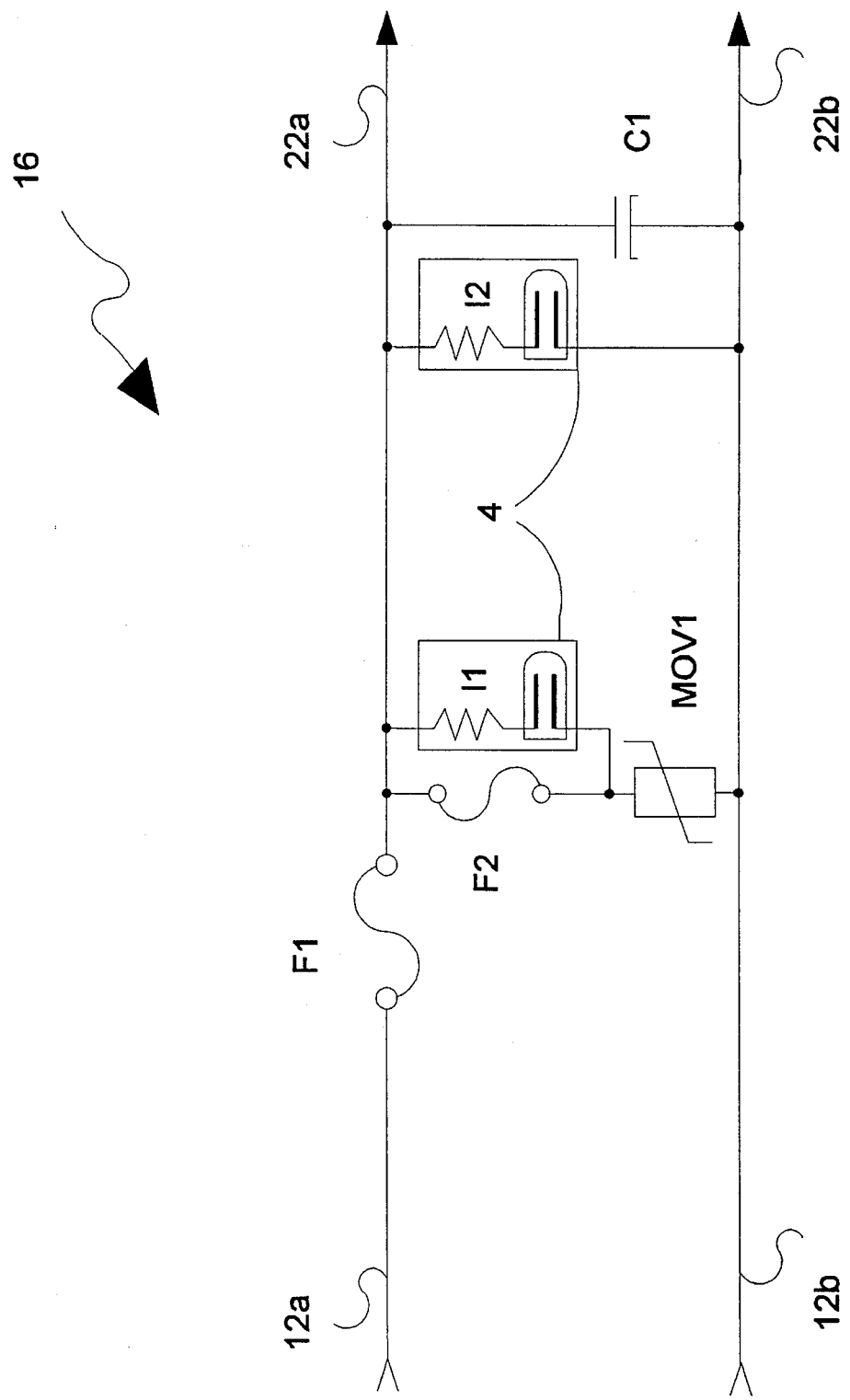
FIG. 2 is a circuit diagram of the first stage of the power surge protection apparatus of FIG. 1.

A circuit diagram for the first stage 16 is illustrated in FIG. 2. The first stage 16 comprises a fuse F1, preferably 5 amperes, in series on connection 12a, which serves the purpose of protecting the circuitry of the entire apparatus. A fuse F2 in series with a metal oxide varistor (MOV) 1 is connected between connections 12a, 12b. The MOV 1 serves as a first line of defense against an electrical surge on connections 12a, 12b. The MOV 1 is preferably a model S20K250 manufactured and commercially available from Siemens, U.S.A., but any suitable conventional MOV may be utilized. Essentially, the MOV 1 serves as a first line of defense against an incoming electrical surge on connections 12a, 12b. The MOV 1 clamps the peak voltage level across connections 12a, 12b at approximately 225 volts. Generally, the MOV 1 serves to clamp and dissipate transients having a long time duration, particularly greater than 15 nanoseconds. Moreover, the MOV 1 is capable of dissipating 130 joules of electrical energy during a power surge.

A lamp indicator I1 is preferably disposed in parallel with the fuse F2, as shown in FIG. 2. The lamp indicator I1 illuminates when the fuse F2 is unshorted. Thus, the indicator I1 will indicate when the MOV 1 has shorted and needs to be replaced for continued electrical surge protection and the fuse F2 was consequently blown and needs to be replaced. Another lamp indicator I2 is disposed between the connections 12a, 12b. The indicator I2 illuminates when the apparatus 10 is in operation and ceases to illuminate when the apparatus 10 is not in operation or the fuse F1 is unshorted, or blown.

A capacitor C1 is disposed between connections 12a, 12b and in parallel with the MOV 1. The capacitor C1, which is preferably 2 microfarads, helps the MOV 1 in detecting and clamping transients. In other words, the capacitor C1 charges during a transient, and the MOV 1 will respond faster to the transient than otherwise. As further shown in FIG. 2, the first stage 16 provides its output to the second stage 17 on connections 22a, 22b, which is in parallel with the capacitor C1.

Figure 3:
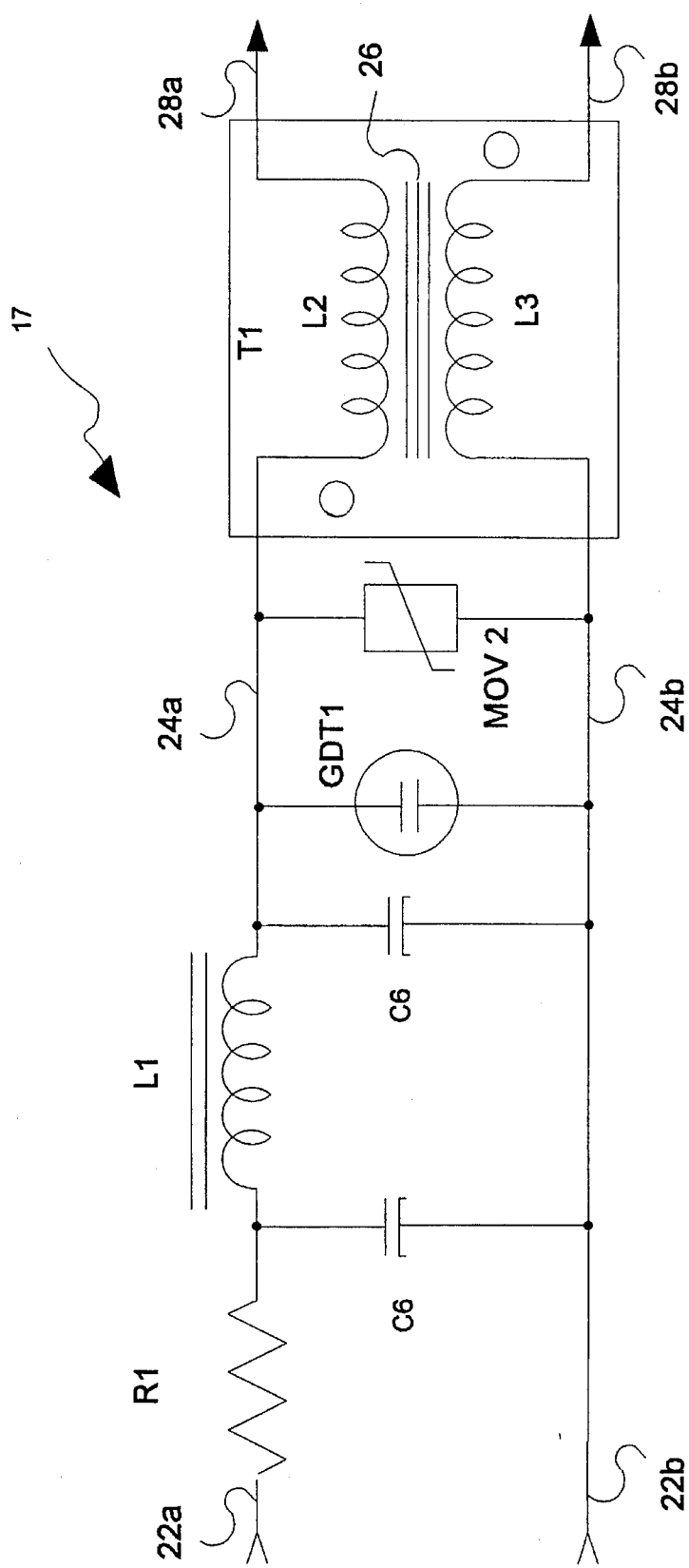
FIG. 3 is a circuit diagram of the second stage of the power surge protection apparatus of FIG. 1.

The second stage of the power surge protection apparatus of FIG. 1 is illustrated in FIG. 3. The second stage 17 has disposed at its input an RC-LC filter, which comprises a resistor R1, a capacitor C2, and an inductor L1, and a capacitor C3, all of which are configured as shown in FIG. 3. The RC-LC filter helps prevent high frequency spikes from passing through the apparatus 10 and exhibits a cutoff frequency as close to 120 hertz (Hz) as possible. In the interests of conserving space and in keeping the cost of the apparatus 10 at a minimum, the cutoff frequency in the preferred embodiment is set at approximately 10 kilohertz with element values as follows: R1=1 ohm ($\Omega$), C2=10 microfarads ($\mu$F), L1=100 millihenry (mH), and C3=5 microfarads ($\mu$F). Because lightning is in the megahertz range, this cutoff frequency is sufficiently adequate for this natural phenomenon.

Next, a gas discharge tube GDT1 is disposed between connections 24a, 24b, as another line of defense against electrical surges. In the preferred embodiment, the GDT1 is a model B1-A350 manufactured and made commercially available from Siemens, U.S.A., but any conventional GDT of a similar capacity may be utilized. The GDT1 responds slowly to electrical surges on or across connections 24a, 24b and therefore ignores fast rise time transients. It serves as primarily a current dissipation device and can dissipate up to 5 kiloamperes of electrical energy in less than 1200 microseconds (10 KV/$\mu$S). The GDT1 generally remains shorted until all surge current has been accommodated and suppressed.

A metal oxide varistor MOV 2 is disposed between connections 24a, 24b. The MOV 2 is preferably a model GEZAK 130 MOV manufactured and commercially available from General Electric Corporation U.S.A., but any suitable conventional MOV may be utilized. The model GEZAK MOV is about 1 inch in diameter and can absorb up to about 70 joules (J) of energy, which is about 6,500 amperes of surge current. The MOV 2 clamps the voltage of the signal on connections 24a, 24b to a peak voltage of approximately 225 volts. The MOV 2 serves primarily as a voltage clamping element and secondarily as an energy dissipation element.

In accordance with a significant feature of the present invention, a bifilar transformer T1 with bifilar-wound inductors L2, L3 is connected between and magnetically couples connections 24a, 24b, as illustrated in FIG. 3. The bifilar transformer serves as a desirable accurate voltage clamping mechanism in the present invention. A "bifilar transformer" is a transformer in which the turns of the primary and secondary windings are wound together side-by-side and in the same direction. This type of winding results in near unity magnetic coupling, so that there is very efficient transfer of energy from the primary to the secondary. In the preferred embodiment, the bifilar-wound inductors L2, L3 of the transformer T1 are produced by wrapping connections 24a, 24b in a twisted pair and a bifilar configuration about a common core 26. The twisted pair configuration and the bifilar configuration are more clearly specified in FIG. 4.

Figure 4:
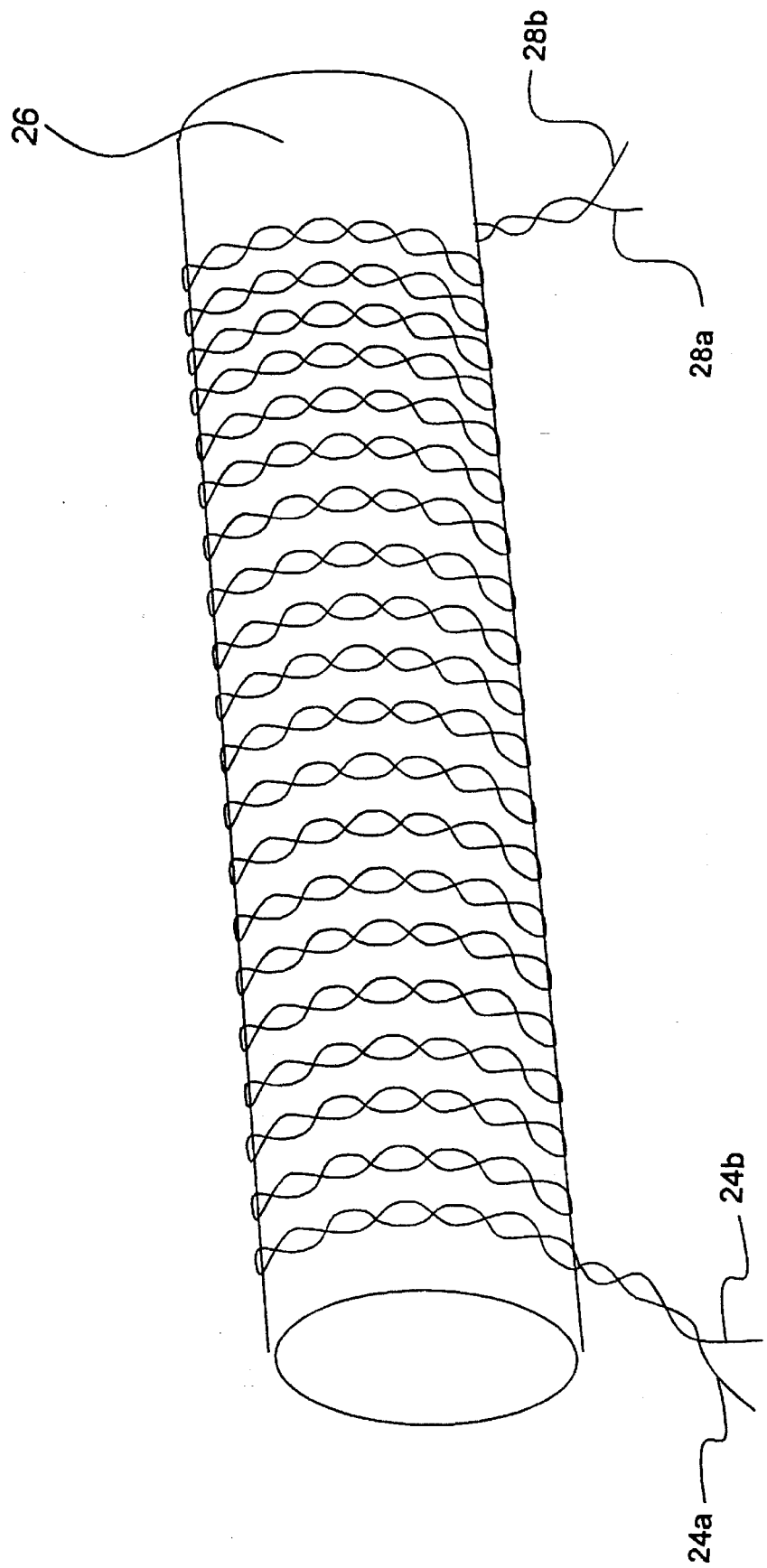
FIG. 4 is a perspective view of the bifilar transformer with associated bifilar wound inductors of FIG. 3.

As shown in FIG. 4, the connections 24a, 24b, one or both of which are insulated, are twisted, preferably tightly, about each other to form a twisted pair of electrically isolated wires. The twisted pair may be held together with any suitable bonding material. Moreover, the twisted pair is wrapped around the core 26 in either a clockwise or counterclockwise rotation. Preferably, the core 26 has a much higher resistivity $\rho$ than the wires within connections 24a, 24b. In the preferred embodiment, the core 26 comprises a conductor having a resistivity $\rho$ of at least as low as $1.7\times10^{-8}$ ohm-meter, such as copper (Cu), and the connections 24a, 24b are an ohmic material having a resistivity $\rho$ of at least $2.8\times10^{-8}$ ohm-meter. Suitable ohmic materials include aluminum (Al) with a resistivity $\rho$ of $2.8\times10^{-8}$, iron (Fe) with a resistivity $\rho$ of $10\times10^{-8}$ ohm-meter, and steel with a resistivity $\rho$ of $7\times10^{-8}$ ohm-meter.

The twisted pair is wrapped or otherwise configured about the core 26 with a plurality of turns, 100 turns in the preferred embodiment, in order to cause electric fields to be produced within the core 26 and to achieve the desired surge dissipation effect. With different materials, different surge protection requirements, and other parameters, the number of turns may obviously change. Because of the configuration of the inductors L2, L3 as shown in FIGS. 3 and 4, the respective electric fields $\epsilon_1$, $\epsilon_2$ which are generated within the core 26 by the electricity passing through connections 24a, 24b are in opposite directions and generally compromise, or diminish, each other. As a result of the bifilar and twisted pair configuration, the electrical signal at the output of the second stage 17 on connections 28a, 28b in FIG. 3 is optimally clamped to an approximate peak voltage of about 300 volts.

Figure 5:
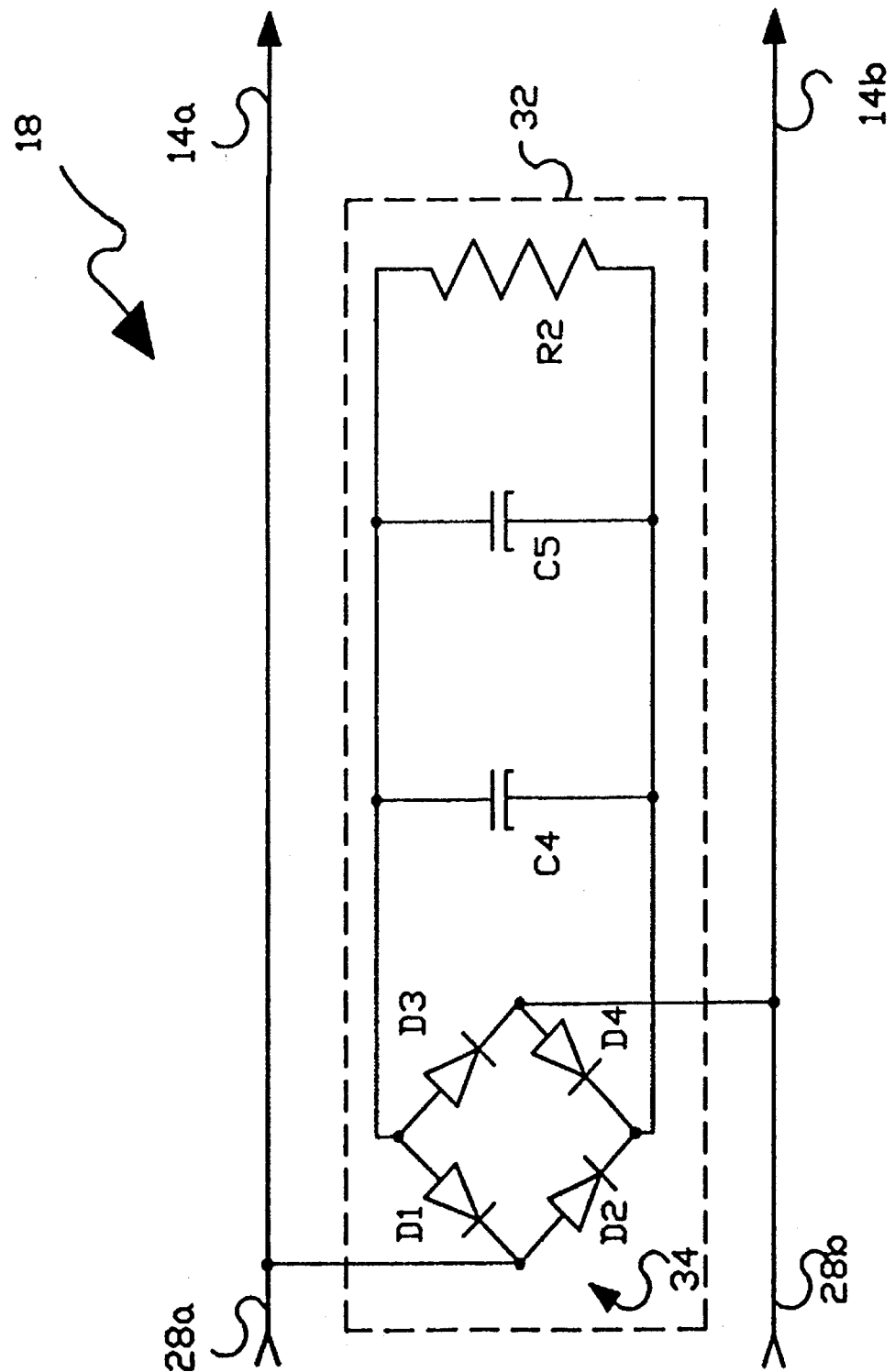
FIG. 5 is a circuit diagram of the third stage of the power surge protection apparatus of FIG. 1.

The third stage 18 of the power surge protection apparatus 10 of FIG. 1 is illustrated in detail in FIG. 5. With reference to FIG. 5, the third stage 18 receives the electrical signal on connections 28a, 28b from the second stage 17. The third stage generally provides another voltage clamping mechanism for very precise voltage amplitude control and dissipates superfluous electrical current to a lesser extent. Of particular significances the third stage 18 has a rectifier mechanism 32 connected between the connections 28a, 28b and serving as a load across the connections 28a, 28b. The rectifier mechanism 32 has preferably a full wave bridge rectifier 34, as shown in FIG. 5, with diodes D1–D4, capacitors C4, C5 in parallel with the DC connections of the full wave bridge rectifier 34, and a resistor R2 in parallel with the capacitors C4, C5. The diodes D1–D4 dissipate superfluous electrical current. The capacitors C4, C5 serve to further dissipate energy and clamp voltage. The resistor R2 allows for automatic reset to the nominal clamping voltage and acts to discharge the capacitors C4, C5 when the power is terminated on connections 12a, 12b (FIG. 1). Preferably, the values for the capacitor C4, capacitor C5 and resistor R2 are as follows: 4 $\mu$F (electrolytic); 0.1 $\mu$F (ceramic); and 10 K$\Omega$. Further, the diodes D1–D4 are rated at 5 amp and 1 kilovolt peak inverse voltage (PIV).

The rectifier mechanism 32 essentially provides precise voltage clamping and dissipates superfluous electrical energy, such as the case when an electrical surge occurs on connections 28a, 28b. Advantageously, the response time of the rectifier mechanism 32 is virtually instantaneous and is much better in terms of response time than a conventional MOV (which must enter an avalanche mode). Moreover, the rectifier mechanism 32 will clamp the voltage on connections 28a, 28b in either the positive or negative direction to a peak voltage of approximately less than 190 volts.

It is obvious to those skilled in the art that many modifications may be made to the preferred embodiment of power surge protection apparatus 10 of the present invention, as set forth hereinbefore, without departing substantially from the principles of the present invention. All such modifications are intended to be included herein within the scope of the present invention, as defined in the following claims.

Wherefore, the following is claimed:

1. In a power surge protection apparatus for protecting circuitry from electrical surges induced in an alternating current power connection to said circuitry, an improvement for optimizing surge suppression with minimal expense and space requirements, the improvement comprising a conductive core with a bifilar winding of a first line and a second line, said first line and said second line being twisted about each other to form a twisted pair and said twisted pair being wrapped about said core in a bifilar winding configuration, said first and second lines comprising an ohmic material having a resistivity of at least $2.8 \times 10^{-8}$ ohm-meter, whereby electric fields generated by said first line and said second line within said core are in opposite directions so as to compromise each other.

2. The apparatus of claim 1, wherein said core comprises a conductor and said first and second lines comprise aluminum.

3. The apparatus of claim 1, wherein said core comprises a conductor and said first and second lines comprise steel.

4. The apparatus of claim 1, wherein said core comprises a conductor having a resistivity of at least as low as $1.7 \times 10^{-8}$ ohm-meter.

5. A power surge protection system for protecting circuitry from electrical surges induced in an alternating current power connection to said circuitry, the system for optimizing surge suppression with minimal expense and space requirements, comprising:

first and second inputs for interfacing with said power connection and for receiving alternating current electricity;

first and second outputs for providing said alternating current electricity to said circuitry;

a first inductor connected between said first input and said first output;

a second inductor connected between said second input and said second output;

wherein said first and second inductors are wound in a bifilar configuration about a common core so that electric fields generated by said first and second inductors within said core are in opposite directions and inhibit each other; and wherein said first and second lines comprise an ohmic material having a resistivity of at least $2.8 \times 10^{-8}$ ohm-meter.

6. The system of claim 5, wherein said core comprises a conductor and said first and second lines comprise aluminum.

7. The system of claim 5, wherein said core comprises a conductor and said first and second lines comprise steel.

8. The system of claim 5, wherein said core comprises a conductor having a resistivity of at least as low as $1.7 \times 10^{-8}$ ohm-meter.

9. A power surge protection method for protecting circuitry from electrical surges induced in an alternating current power connection to said circuitry, the method comprising the steps of:

receiving electrical energy on an alternating current electrical power connection having first and second electrical lines;

passing said electrical energy in said first line through a first inductor;

passing said electrical energy in said second line through a second inductor, said first inductor and said second inductor being wound about each other to form a twisted pair and said twisted pair being wrapped about a common core in a bifilar configuration, said first inductor and said second inductor being comprised of an ohmic material having a resistivity of at least $2.8 \times 10^{-8}$ ohm-meter; and providing power to said circuitry being protected from said first and second inductors; and generating electric fields with said inductors within said core in opposite directions so that said electric fields compromise each other.

* * * * *